United States Patent Office 3,074,893
Patented Jan. 22, 1963

3,074,893
PREPARATION OF CATALYST SUPPORTS AND CATALYSTS
Henry George Ellert and Elroy Merle Gladrow, Baton Rouge, La., assignors to Esso Research and Engineering Company, a corporation of Delaware
No Drawing. Filed May 1, 1957, Ser. No. 656,184
9 Claims. (Cl. 252—465)

The present invention pertains to catalyst supports and to catalyst compositions useful in the conversion of hydrocarbons and particularly to the preparation of high surface area catalysts of good activity and selectivity characteristics for the reforming of hydrocarbons and which are characterized by showing very high surface area retention or stability.

Reforming or upgrading of hydrocarbon fractions boiling in the naphtha or motor gasoline boiling range into high octane number motor fuels by treatment thereof at elevated temperatures and at atmospheric pressure as well as superatmospheric pressures, preferably in the presence of added hydrogen and in contact with solid catalytic agents, is an extremely important and widely practiced process. In view of the ever increasing demands for larger quantities of high octane number motor gasolines necessary to satisfy the premium motor fuel requirements of modern high compression automobile engines, much effort has been expended in developing new or improved reforming catalysts and processes.

In reforming as in numerous other catalytic processes, it has been found that small differences in catalyst composition as well as in the methods of preparing the catalyst compositions can make considerable differences in the efficacy of the composition for use in a particular catalytic process. In many instances, small differences in the catalyst composition may make the difference between a satisfactory or commercially successful reforming process and an unsuccessful one. In reforming, the desiderata for the catalyst compositions are (1) high activity so that large quantities of feed stock can be charged to the reactor in a unit of time, (2) good selectivity so that large quantities or yields of high octane material are obtained with minimum formation of gaseous and solid carbonaceous by-products, (3) good stability so that the catalyst will give a satisfactory and uniform performance over extended periods of operation.

It is an object of this invention to provide new catalyst compositions for use in the vapor phase conversion of hydrocarbons.

Another object of this invention is to provide new catalyst compositions of good stability, selectivity and activity characteristics for use in the reforming of hydrocarbon fractions.

It is also the object of this invention to provide the art with an improved process for preparing reforming catalysts.

Still other objects will become apparent from the following description and claims.

It has now been found that new and improved catalysts suitable for the reforming of hydrocarbon fractions are prepared by hydrolyzing an alkyl titanate in an acid solution of a chromium salt thereby forming chromia-titania cogels. When relatively small amounts of chromium salts are used, the chromia serves as a stabilizer to the titania imparting greater surface area and resistance to degradation by heat than is found in pure titania bases. When larger amounts of chromia are provided in the chromia-titania cogels, the chromia serves both as a stabilizer to the titania and as an active catalytic agent. The chromia-titania cogels may be impregnated or composited with active catalyst components, activators or promoters to yield active and useful catalysts for hydrocarbon conversion, particularly for the reforming of naphtha fractions.

The alkyl titanates or titanium alkoxides that may be used in accordance with the present invention are those containing from one to seven carbon atoms per alkoxide group such as the tetramethyl, tetraethyl, and the isomeric tetrapropyl, tetrabutyl, tetra amyl, tetra hexyl, and tetra heptyl titanates. It is preferred but not required that those alkyl-titanates be used whose hydrolysis products comprise water immiscible alcohols so as to facilitate handling and recovery of the products.

Alkyl titanates are generally prepared by reacting titanium tetrachloride with an alcohol in the presence of a strongly basic catalyst such as metallic sodium or anhydrous ammonia. These titanates, as well as mixed alkyl titanates which may be prepared by reacting titanium tetrachloride with a mixture of alcohols, may be employed in this invention either per se or diluted with an alcohol or a petroleum hydrocarbon fraction. When a diluent is employed it is prudent to select a material boiling in the same range as the alcohol formed in the hydrolysis.

Hydrolysis of the alkyl titanates is effected in accordance with the present invention by means of an acid solution of a chromium salt. Suitable acid solutions are those containing from about one to as high as 60 weight percent of an acid such as formic acid, acetic acid, trichloroacetic acid, and chromic acid.

Chromium salts that may be added to the acid hydrolyzing solution include chromium chloride, chromium acetate, and chromic acid in amount sufficient to provide the desired chromia content in the final product. Amounts of chromia up to about 5 weight percent in the final catalyst composite act principally as a stabilizer to the titania and to a minor extent, as a catalytic agent. Larger amounts of chromia, say, about 5 to 20 or 30 weight percent in the cogel serve not only to stabilize the titania but also to impart very substantial catalytic activity to the composition. If desired, small amounts of hydrophylic colloids such as gelatins, polyvinyl alcohol and others may be added to the hydrolyzing medium. If desired, a minor proportion of alumina, i.e., about 2 to about 20 weight percent based on titania may be provided in the final composition by mixing small amounts of an aluminum alcoholate such as aluminum butylate or aluminum amylate with the alkyl titanate so that the aluminum alcoholate will be hydrolyzed at the same time as the titanate, thus in effect, making three-component cogels. A similar effect may be obtained by the addition of a minor amount of alumina or silica hydrosol to the chromia-titania sol in order to further improve the stability thereof.

The actual processes involved are the addition of an alkyl titanate or a mixture of the titanate and an aluminum alcoholate to an aqueous acid solution of a chromium salt. The addition is carried out slowly at 40–125° F., and preferably at room temperature. Vigorous agitation is employed throughout to assure homogeneity of the mixture. Gelation is then effected by warming to about 150–200° F. This gel is then either washed with water, acetone, alcohol, etc. followed by oven drying or subjected directly to oven drying at 212–350° F. Third components such as silica or alumina may also be incorporated in the composition by adding hydrosols of the material to the titanate reaction mixture. This is best accomplished by slow addition with rapid stirring. In any case the dry gel is prepared for use in catalytic conversions by calcining for two to twenty hours at 500–1600° F., and preferably for about sixteen hours at 1000° F.

The chromia-titania cogel with or without the addition of alumina or silica as a further stabilizer may be impregnated or composited with an active catalytic component such as $MoO_3$, $CoO-MoO_3$, $WO_3$, Pt, Pd, Ni, $MoS_3$, $NiS-WS_3$, and the like, to yield an active and useful catalyst for the conversion of hydrocarbons, especially for upgrading naphtha fractions either by the conversion of hydrocarbons to higher octane number products, or by the elimination of materials such as sulfur, which impart bad odor and lowers the increase in octane number obtainable from the addition of tetraethyl lead to the gasoline containing the sulfur.

The active catalytic component may be incorporated in the cogel by wet impregnation with a suitable salt of the particular metal followed by drying and calcination. If the ultimate active component in the formulation is a metal in the elemental state reduction is accomplished by suitable treatment with hydrogen or other reducing agent; if the active component is a metal sulfide the conversion of the metal salt may be effected by treatment with $H_2S$, amonium sulfide, or other sulfides. If desired, other methods of impregnation which are known to the art may also be employed.

Compositions prepared in accordance with the present invention are useful for the conversion of hydrocarbons and particularly for the upgrading of naphtha fractions boiling between about 125 and 425° F. and for upgrading higher boiling materials such kerosene, diesel oils, etc. The hydrocarbon fractions may be virgin stocks or they may be thermal or catalytic stocks or mixtures thereof. Hydrocarbon conversions may be effected in contact with the above described compositions at temperatures of from about 700 to about 1200° F. and at pressures of from atmospheric to about 1000 p.s.i.g. It is ordinarily desirable to supply hydrogen or hydrogen-rich process gas to the reaction zone although this may be only practical at elevated pressures where carbon formation tends to become excessive and the problem of providing an effective hydrogen partial pressure is lessened.

The following examples are typical of the present invention.

Example 1

Two hundred milliliters of isopropyl titanate are added slowly with vigorous agitation to a solution of 7.63 grams of $Cr_2(C_2H_3O_2)_6 \cdot 2H_2O$ in 1 liter of 50% acetic acid. The resulting sol is heated slowly to 165° F. in a water bath. At this temperature a firm hydrogel is formed which is oven dried at 250° F. Calcining of the gel for 16 hours at 1000° F. yielded a pure chromia-titania cogel which has a surface area of 75 m.$^2$/g. and a pore volume of 0.22 cc./g. This catalyst has the composition 10% $CR_2O_3$–90% $TiO_2$ and is designated catalyst "A."

Example 2

A solution composed of 62 ml. of stock aluminum amylate (100 g. $Al_2O_3$/liter) in 400 ml. of sec. butyl titanate is added slowly with vigorous agitation to a solution of 33 g. $CrO_3$ in 2 liters of 50% acetic acid. On heating to the point of incipient boiling the sol sets to a firm hydrogel which is oven dried at 250° F. Calcining of this material for 16 hours at 1000° yields the pure chromia-titania-alumina gel which has a surface area of 146 m.$^2$/g. and a pore volume of 0.32 cc./g. This catalyst has the composition 5% $Al_2O_3$–20% $Cr_2O_3$–75% $TiO_2$ and is designated catalyst "B."

Example 3

Eight liters of n-butyl titanate are added slowly to 55 liters of 5% acetic acid, using rapid stirring. The alcohol formed in the hydrolysis is removed by steam stripping and the aqueous slurry is oven dried. After calcining 16 hours at 1000° F. the base has a surface area of 64 m.$^2$/g. The base is impregnated as follows: 180 grams are impregnated with a solution comprised of 33.2 g. of $(NH_4)_2Cr_2O_7$ in 70 ml. of distilled water and the resulting paste is oven dried and calcined for 16 hours at 1000° F. This catalyst comprises 10% $Cr_2O_3$–90% $TiO_2$ and is designated catalyst "C."

Example 4

The following data are submitted to illustrate the superior and unusual catalytic properties of the cogels "A" and "B" as compared to the impregnated base, catalyst "C."

Conditions of catalyst test:
  Pressure _____ Atmospheric.
  Temperature _____ 1000° F.
  Feed _____ n-Heptane.
  Feed rate _____ 0.5 v./v./hr.
  Mole ratio hydrogen/n-heptane __ 2/1.

| Catalyst | Product: Mole percent | |
|---|---|---|
|  | Aromatics | Olefins |
| "A" | 21 | 19 |
| "B" | 45 | 0 |
| "C" | 31 | 0 |

The foregoing specification contains a limited number of embodiments of the present invention. It will be understood, however, that the present invention is not limited thereto since numerous variations are possible without departing from the scope of the following claims.

What is claimed is:

1. The method of preparing catalysts which consists essentially of mixing an alkyl titanate selected from the group consisting of alkyl titanates having from one to seven carbon atoms per alkoxide group with an aqueous acid solution of a chromium salt with vigorous agitation at temperatures of 40 to 125° F., warming the mixture to about 150–200° F. to thereby form a chromia-titania cogel, drying and activating the cogel.

2. The method of preparing catalysts which consists essentially of mixing an alkyl titanate selected from the group consisting of alkyl titanates having from one to seven carbon atoms per alkoxide group with an aqueous acid solution of a chromium salt with vigorous agitation at temperatures of 40 to 125° F., warming the mixture to about 150–200° F. to thereby form a chromia-titania cogel, the amount of chromium salt being sufficient to provide up to about 30 weight percent chromia in said cogel, drying and activating the cogel.

3. The method of preparing catalysts which consists essentially of mixing an alkyl titanate selected from the group consisting of alkyl titanates having from one to seven carbon atoms per alkoxide group with an aqueous acid solution of a chromium salt with vigorous agitation at temperatures of 40 to 125° F., warming the mixture to about 150–200° F. to thereby form a chromia-titania cogel, drying and activating the cogel, and incorporating an active catalytic component into the said cogel.

4. The method of preparing catalysts which consists essentially of mixing an alkyl titanate selected from the group consisting of alkyl titanates having from one to seven carbon atoms per alkoxide group with an aqueous acetic acid solution of a chromium salt with vigorous agitation at temperatures of 40 to 125° F., warming the mixture to about 150–200° F. to thereby form a chromia-titania cogel, drying and activating the cogel.

5. The method of preparing catalysts which consists essentially of mixing an alkyl titanate selected from the group consisting of alkyl titanates having from one to seven carbon atoms per alkoxide group with an aqueous acetic acid solution of a chromium salt with vigorous agitation at temperatures of 40 to 125° F., warming the mixture to about 150–200° F. to thereby form a chromia-titania cogel, drying and activating the cogel, and incorporating an active catalytic component into the said cogel.

6. The method of preparing catalysts which consists essentially of mixing an alkyl titanate selected from the group consisting of alkyl titanate having from one to seven carbon atoms per alkoxide group and an aluminum alcoholate in an amount to provide 2 to 20 weight percent of alumina based on titania with an aqueous acid solution of a chromium salt with vigorous agitation at temperatures of 40 to 125° F., warming the mixture to about 150–200° F. to thereby form a chromia-titania-alumina cogel, drying and activating the cogel.

7. The method of preparing catalysts which consists essentially of mixing an alkyl titanate selected from the group consisting of alkyl titanates having from one to seven carbon atoms per alkoxide group and an aluminum alcoholate in an amount to provide 2 to 20 weight percent of alumina based on titania with an aqueous acid solution of a chromium salt with vigorous agitation at temperatures of 40 to 125° F., warming the mixture to about 150–200° F. to thereby form a chromia-titania-alumina cogel, the amount of chromium salt being sufficient to provide up to about 30 weight percent chromia in said cogel, drying and activating the cogel.

8. The method of preparing catalysts which consists essentially of mixing an alkyl titanate selected from the group consisting of alkyl titanates having from one to seven carbon atoms per alkoxide group and an aluminum alcoholate in an amount to provide 2 to 20 weight percent of alumina based on titania with an aqueous acid solution of a chromium salt with vigorous agitation at temperatures of 40 to 125° F., warming the mixture to about 150–200° F. to thereby form a chromia-tiania-alumina cogel, drying and activating the cogel, and incorporating an active catalytic component into the said cogel.

9. The method of preparing catalysts which consists essentially of mixing an alkyl titanate selected from the group consisting of alkyl titanates having from one to seven carbon atoms per alkoxide group and an aluminum alcoholate in an amount to provide 2 to 20 weight percent of alumina based on titania with an aqueous acetic acid solution of a chromium salt with vigorous agitation at temperatures of 40 to 125° F., warming the mixture to about 150–200° F. to thereby form a chromia-titania-alumina cogel, drying and activating the cogel.

References Cited in the file of this patent

UNITED STATES PATENTS

| | | |
|---|---|---|
| 2,288,320 | Morey | June 30, 1942 |
| 2,351,624 | Mavity | June 20, 1944 |
| 2,653,964 | Hagemeyer | Sept. 29, 1953 |
| 2,894,901 | Gilbert et al. | July 14, 1959 |

OTHER REFERENCES

"A Comprehensive Treatise on Inorganic and Theoretical Chemistry," vol. 7, page 32, by Mellor (1927).